United States Patent
Ackerman et al.

(10) Patent No.: US 10,507,477 B2
(45) Date of Patent: Dec. 17, 2019

(54) ELECTROSTATIC SPRAYING SYSTEM

(71) Applicant: Spraying Systems Co., Wheaton, IL (US)

(72) Inventors: Thomas E. Ackerman, Manchester, NH (US); David C. Huffman, Merrimack, NH (US); Glenn R. St. Peter, Atkinson, NH (US)

(73) Assignee: Spraying Systems Co., Wheaton, IL (US)

( * ) Notice: Subject to any disclaimer, the term of this patent is extended or adjusted under 35 U.S.C. 154(b) by 222 days.

(21) Appl. No.: 15/320,427

(22) PCT Filed: Jun. 19, 2015

(86) PCT No.: PCT/US2015/036750
§ 371 (c)(1),
(2) Date: Dec. 20, 2016

(87) PCT Pub. No.: WO2015/196110
PCT Pub. Date: Dec. 23, 2015

(65) Prior Publication Data
US 2017/0189921 A1   Jul. 6, 2017

Related U.S. Application Data

(60) Provisional application No. 62/015,113, filed on Jun. 20, 2014.

(51) Int. Cl.
*B05B 5/025* (2006.01)
*B05B 1/30* (2006.01)
(Continued)

(52) U.S. Cl.
CPC ............. *B05B 5/025* (2013.01); *B05B 1/02* (2013.01); *B05B 1/304* (2013.01); *B05B 5/001* (2013.01); *B05B 15/58* (2018.02); *F16N 7/12* (2013.01)

(58) Field of Classification Search
None
See application file for complete search history.

(56) References Cited

U.S. PATENT DOCUMENTS 3,852,095 A * 12/1974 Hogstrom ........... B05B 13/0242
427/284
4,634,057 A * 1/1987 Coffee ..................... B05B 5/16
239/302

(Continued)

OTHER PUBLICATIONS

International Search Report dated Sep. 18, 2015, in International Patent Application No. PCT/US2015/036750.

*Primary Examiner* — Charles Capozzi
(74) *Attorney, Agent, or Firm* — Leydig, Voit & Mayer, Ltd.

(57) ABSTRACT

A lubricant dispensing system having particular utility for applying a tightly controlled thin line of lubricant about the perimeter of cans as they are processed. The lubricant dispensing system includes an electrostatic spray head having a nozzle body that defines a lubricant receiving chamber for electrically charging lubricant therein and a capillary tube supported by the nozzle body having an inlet end communicating with the lubricant receiving chamber and an outlet that defines a discharge orifice of the electrostatic spray head. The capillary tube has a diameter between about 0.2 and 0.3 inches for directing electrostatically charged lubricant onto an item to be lubricated in a controlled thin line having a width no greater than 0.125 inches. The electrode is adjustably positionable relative to the capillary tube for selectively controlling the rate of discharging lubricant, and the electrode is configured for enhancing electrostatic charging of lubricant through the capillary tube.

16 Claims, 4 Drawing Sheets

(51) Int. Cl.
*B05B 1/02* (2006.01)
*F16N 7/12* (2006.01)
*B05B 5/00* (2006.01)
*B05B 15/58* (2018.01)

(56) References Cited

U.S. PATENT DOCUMENTS

| | | |
|---|---|---|
| 5,044,564 A | 9/1991 | Sickles |
| 5,176,321 A * | 1/1993 | Doherty ................ B05B 5/0255 239/3 |
| 2009/0045270 A1* | 2/2009 | Muljono ................ B05B 5/035 239/690 |
| 2012/0247876 A1 | 10/2012 | Kreutzkamper et al. |
| 2013/0140385 A1* | 6/2013 | Demmons ................ B05B 5/03 239/706 |

* cited by examiner

ELECTROSTATIC SPRAYING SYSTEM

CROSS-REFERENCE TO RELATED APPLICATIONS

This patent application claims the benefit of U.S. Provisional Patent Application No. 62/015,113, filed Jun. 20, 2014, which is incorporated by reference.

FIELD OF THE INVENTION

The present invention relates generally to spraying systems, and more particularly to an electrostatic spraying system for applying hot melt waxes, oils, greases, or other lubricants onto metal parts or the like. The invention has particular application to systems for applying hot melt waxes to cans in beverage can necking machines.

BACKGROUND OF THE INVENTION

In beverage can necking machines, it is necessary that a lubricant such as wax be applied to the top rough edge of a can prior to the can entering the can necking machine in order to lubricate forming dyes of the machine. The wax must be applied in a fine line of about no more than 0.125 inches from the top of the can and should not wrap around the inside of the can. It is known to use roller applicator devices for applying such wax about the end perimeters of the cans. In such devices, a series of working rollers are partially immersed in a vat of molten wax under the moving conveyer line. The wax soaked rollers apply wax to the cans as they are rolled on a passing conveyor. Due to the arrangement of such roller applications, any loose bits of aluminum oxide from the rough edges of the cans being coated may fall into the vat mixing with the wax and building up on the rollers. This creates undesirable dark marks on the edges of the can. Such devices also do not permit adjustability or reliable consistency in wax application in high speed canning operations. Under or uneven lubricating can cause galling inside the forming dyes of the machine. Once the dye is galled in such manner it can cause denting, dinging, or scratching in the subsequently processed cans. Over lubricating, particularly on the inside of the cans, may result in contamination of the beverage product itself. Since can necking machines operate at speeds as high as 3000 cans per minute, any such defects in the wax application can cause rejection and scrapping of large batches of cans.

OBJECTS AND SUMMARY OF THE INVENTION

It is an object of the present invention to provide a spraying system for more uniformly and efficiently applying hot melt waxes, oils, or other lubricants to metal parts or the like.

Another object is to provide an electrostatic spraying system as characterized above that is adapted for more precisely applying fine lines of lubricant to metal parts in high speed manufacturing operations.

A further object is to provide an electrostatic spraying system of the foregoing type that is adapted for adjustable operation for the particular spray application carried out.

Still another object is to provide an electrostatic spraying system of the above kind that has particular applicability for use in high speed beverage can necking machines.

Still a further object is to provide such an electrostatic spraying system that is relatively simple in construction and which lends itself to economical manufacture and usage.

Other objects and advantages of the invention will become apparent upon reading the following detailed description and upon reference to the drawings, in which:

Figure 1:
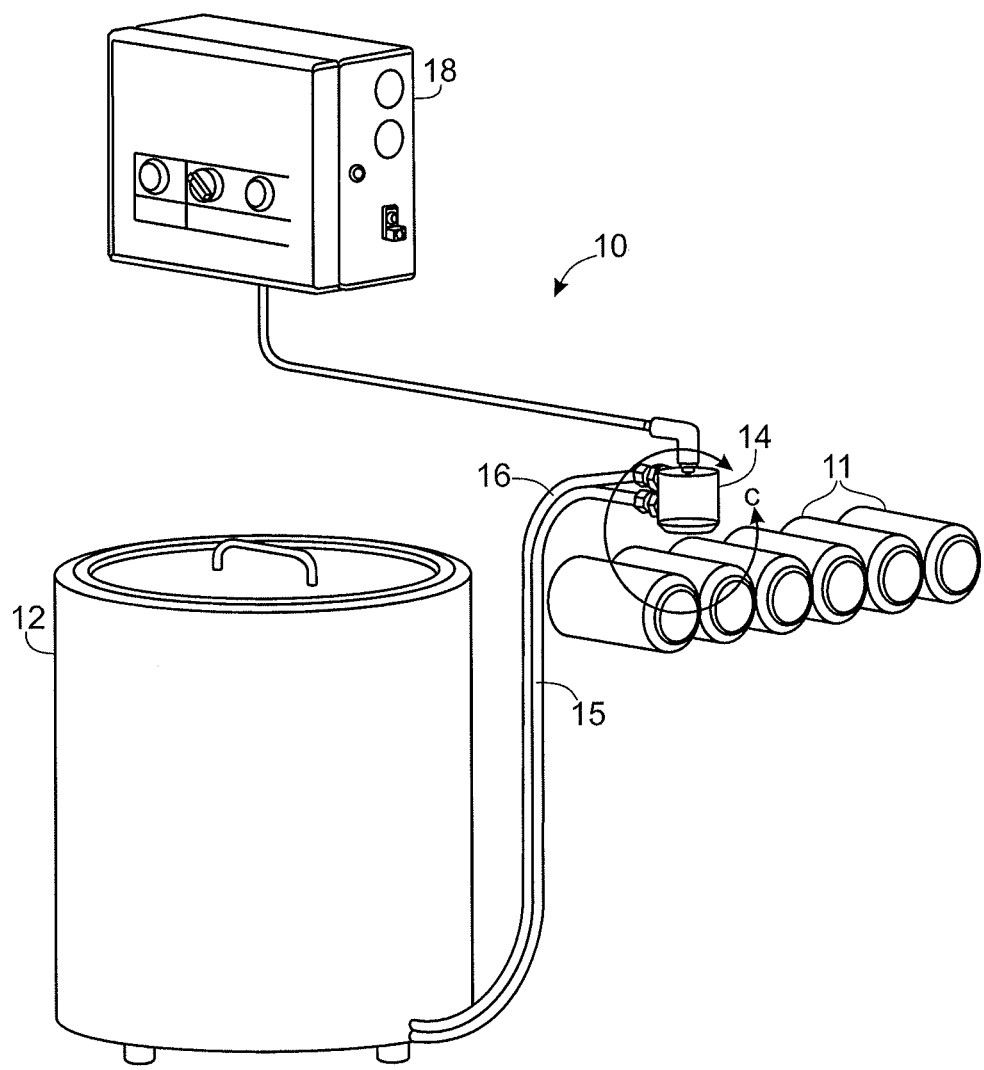
FIG. 1 is a perspective of an illustrative lubricant dispensing system in accordance with the present invention shown for use in a can necking operation.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the invention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative lubricant dispensing system 10 in accordance with the invention. The illustrated lubricant dispensing system 10 is shown for use in applying hot melt wax to the end perimeters of beverage cans 11, such as during processing through a high speed can necking machine. The lubricant dispensing system 10 in this case includes a heated tank or reservoir 12 with an internal pumping system for containing a quantity of lubricant such as wax in a heated state, an electrostatic spray head 14 coupled to the tank 12 by supply and return conduits 15, 16 respectively, and a control 18 for controlling power to the electrostatic spray head 14. As will be understood by persons skilled in the art, in can necking machines, beverage cans are simultaneously rotated as they are conveyed past a coating station where a small quantity of lubricant is applied to the end perimeters of the cans. As will be appreciated by those skilled in the art, the present invention is not limited to such a specific application, but can be used in any application involving fine line coating of components or assemblies whether made of electrically conductive or non-electrically conductive materials, such as for example, electronic components, micro-metal stampings, and the like. Likewise, the invention is applicable to lubricant dispensing systems whether or not the lubricant is heated.

The illustrated spray head 14 includes a generally cylindrical nozzle body 20 that defines an internal liquid receiving chamber 21 which in this case functions as a liquid supply and recirculation chamber 21. The nozzle body 20 in this case has a two part construction comprising an upper cylindrical body section 20a and a bottom spray tip retaining section 20b. The bottom section 20b in this instance has an upstanding cylindrical wall 22 with an externally threaded section 24 for engagement and retention within a lower threaded portion of the upper body section 20a and defines a lower portion of the liquid supply and recirculation chamber 21. A pair of hose connecting couplings 25, 26 in this case is threadedly supported within a side of the upper body section 20a for enabling easy connection and removal of the lubricant supply and return conduits 15, 16 respectively. A sealing annular o-ring 28 is interposed between radially extending walls 29 of the bottom body section 20b and underside of the upper body section 20a. The body sections 20a, 20b preferably are made of non-metallic plastic material, such as sold under the trade name Ultem®, which has a high dielectric strength and melting point and is subject to economical machine manufacture.

The bottom nozzle body section 20b in this case supports a capillary tube 30 within an upstanding support member which in this case is a cylindrical post 31 disposed centrally with the liquid supply or recirculation chamber 21. The capillary tube 30 preferably is made of stainless steel and has an internal diameter of between about 0.020 and 0.032 inches. The nozzle body bottom section 20b in this case is formed with a depending conical extension 32, through which the capillary tube 30 protrudes a small distance "1" for defining a liquid discharge orifice 30a of the spray head 14. An upper most portion of the upstanding post 31 is formed with an enlarged diameter entry passageway 35 for communicating liquid between the liquid supply and recirculation chamber 21 and the capillary tube 30.

For electrically charging liquid as it is directed about the recirculation chamber 21 and through the inlet passage 35 and capillary tube 30, the spray head 14 has an elongated high voltage electrode 40 supported within the upper nozzle body section 20a and extending in depending fashion into the liquid supply and recirculation chamber 21. The electrode 40 may be made of any suitable electrically conductive material and in this case is supported within an upstanding internal collar 41 of the upper nozzle body section 20a. For coupling the electrode 40 to a high voltage electrical source, a spark plug boot 42 of a conventional type is fitted over the upstanding end of the electrode 40 for connecting the electrode 40 to the high voltage charging cable 44 connected to the control 18. It will be appreciated that the boot 42 may be configured for quick disconnect connection and disconnection of the electrode 40 to the cable 44.

It can be seen that lubricant introduced into the liquid supply and recirculation chamber 21 by the supply line 15 is not only charged by the electrode 40 but directed about the chamber 21 for recirculation through the return line 16 to the heated reservoir 12 for purposes of maintaining the nozzle body 20 and capillary tube 30 within a narrow temperature range without solidifying or overheating the lubricant, and while maintaining the electrostatic charge of the liquid substantially isolated within the chamber.

For controlling the liquid flow rate to and through the capillary tube 30 for enhancing the electrical charge of liquid and thin line liquid discharge, the lower terminal end of the electrode 40 has a lower conically pointed end 40a that cooperates with a conical valve seat 48 of similar angle in the upper end of the nozzle body post 31 and entry passageway 35 to the capillary tube 30. The similarly tapered side of pointed electrode end 40a and the valve seat 48 of the post entry passage 35 define a relatively small gap or passageway 50 through which liquid may pass at a precisely controlled relatively small volume rate. The pointed electrode end 40a further enhances electron transfer to the passing liquid since the greatest concentration of electrons is at the tip of the terminal end.

Figure 4:
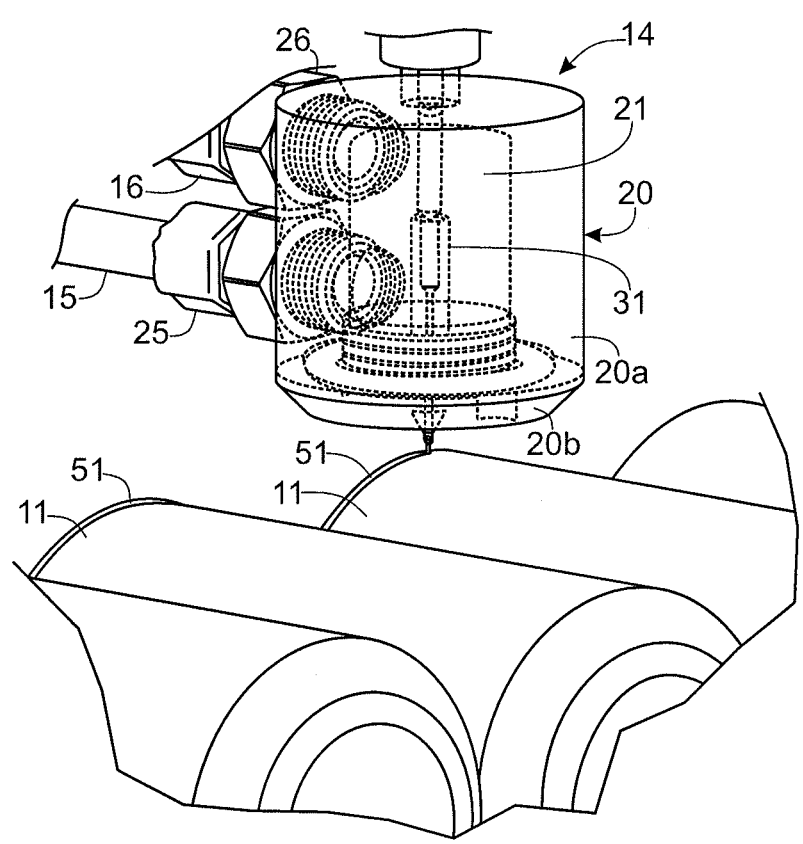
FIG. 4 is an enlarged fragmentary perspective of the electrostatic dispensing head applying fine line lubricant to the end perimeters of cans, such as during processing in a can necking operation.

It will be seen that the electrostatic charge applied to the liquid while inside the nozzle body 20 and passing through the capillary tube 30 causes the repulsion of similarly charged molecules as they are discharged from the capillary tube 30. As the fluid stream leaves the capillary tube 30, the repulsion causes the liquid to break up into a single stream atomization with droplets in aligned relation to each other. With the droplets positively charged and the passing cans 11 at ground, the droplets can be precisely directed toward the target, namely the upper most perimeters of the cans 11 in a substantially direct path. This enables the spray head 14 to accurately maintain the liquid discharge within a tightly controlled range, such as about 0.125 inches or less for coating thin line 51 of the lubricant (FIG. 4), as particularly required in coating cans in can necking machines. Such atomization and direction of the lubricant further is advantageous since it minimizes pressure drops in the liquid direction and can be accurately operated at low flow rates that prevent the chance of over application, waste of lubricant, and product defects.

Figure 2:
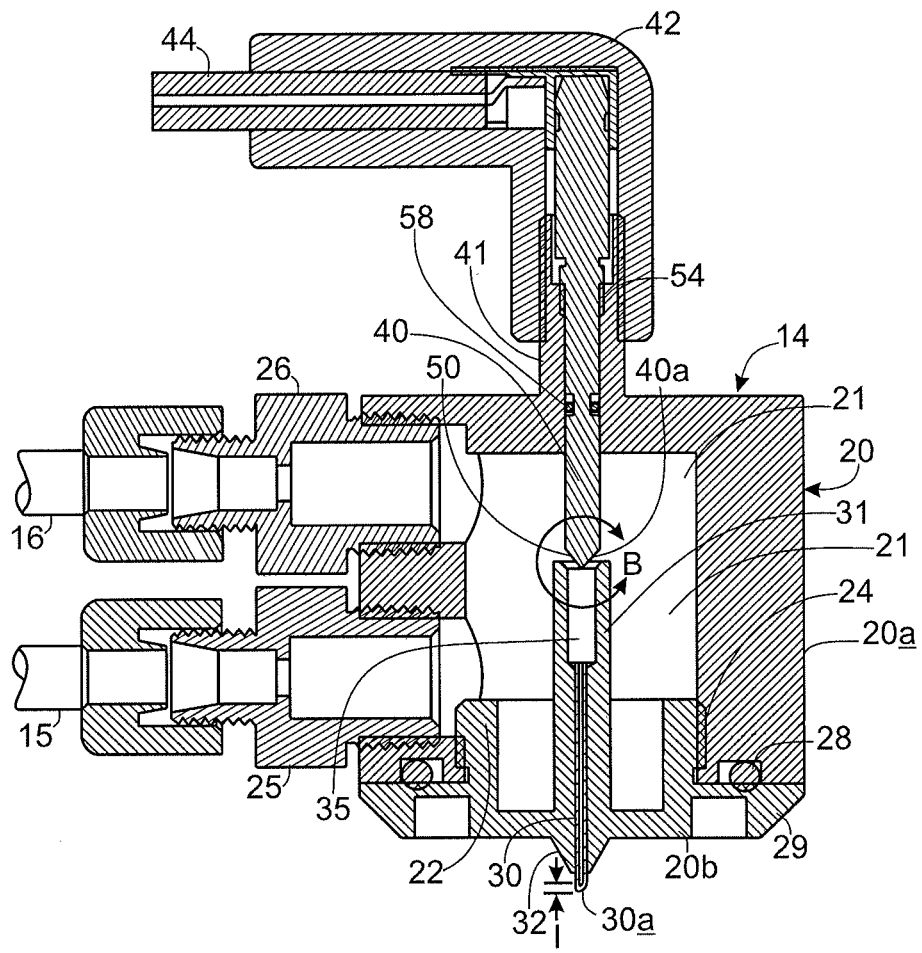
FIG. 2 is an enlarged vertical section of the electrostatic liquid dispensing head of the illustrated system.
Figure 3:
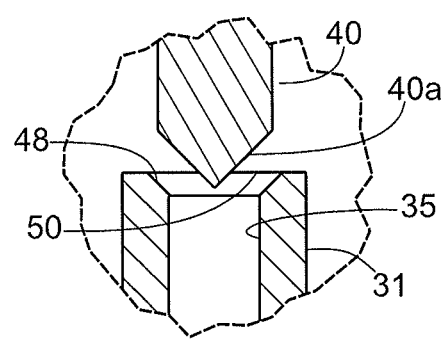
FIG. 3 is an enlarged section of a circular detail designated B in FIG. 2.
Figure 5:
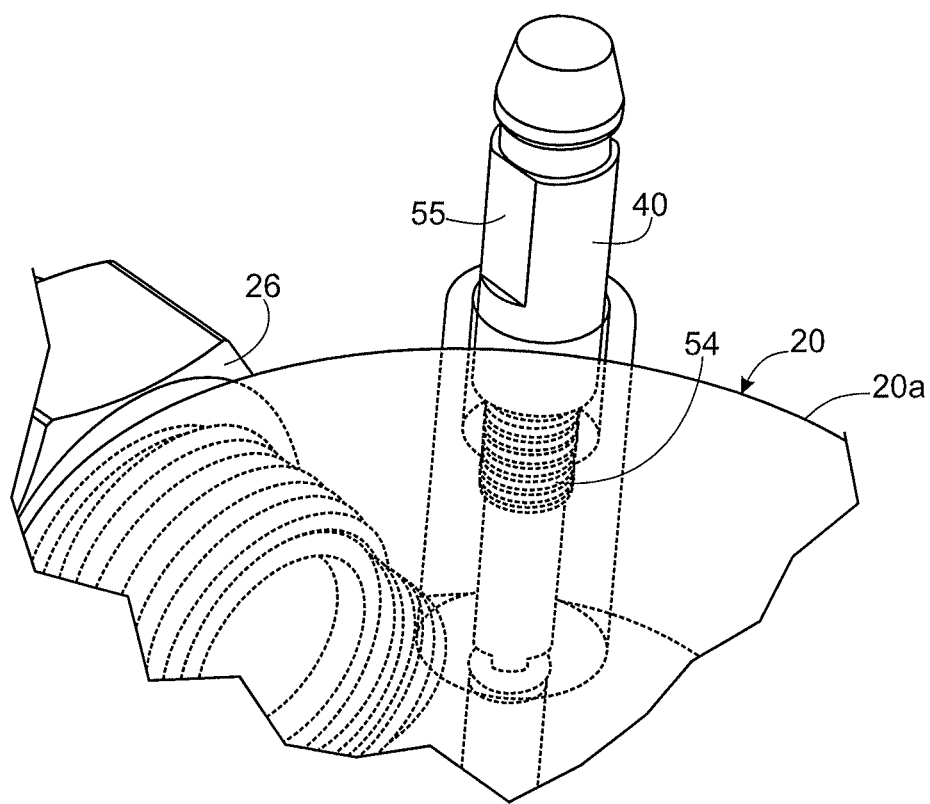
FIG. 5 is an enlarged fragmentary section illustrating the adjustable mounting of the charging electrode within the nozzle body of the illustrated electrostatic dispensing head.

In accordance with a further feature of the illustrated embodiment, the electrode 40 serves both for charging the lubricant as it is directed through the spray head 14, as well as controlling and adjusting the flow rate of the liquid. As depicted in FIGS. 2 and 5, the charging electrode 40 is threadedly supported within a threaded section 54 of the outstanding collar 41 of the nozzle body 20 and the upper protruding end of the electrode is formed with a pair of flats 55 which, upon removal of the boot 42, can be easily engaged by a wrench for rotating the electrode 40 such that the lower end is in precisely positionable relative to the leveled valve seat 48 for the desired flow rate. Hence, the liquid flow rate can be precisely adjusted for the particular application of the fine line spray. An o-ring 58 in this case is interposed between the electrode 40 and nozzle body 20 at a location inwardly of the threaded section 54 for preventing possible leakage.

From the foregoing it can be seen that an electrostatic spray system is provided for uniformly and efficiently applying hot melt waxes, oils, and other lubricants. While system is particularly adapted for applying fine lines of lubricant to metal parts, such as to the precisely controlled target areas about the perimeter of cans in high speed can necking machines, it has utility for numerous other spray applications, whether involving metallic or non-metallic parts. The dispensing system further is adapted for easy adjustability for the particular spray application, while yet being relatively simple in construction.

The invention claimed is:

1. A lubricant dispensing system comprising:
a lubricant supply;
an electrostatic spray head for receiving lubricant from said lubricant supply;
said spray head including a nozzle body that defines a lubricant receiving chamber;
an electrode assembly including an electrode mounted in said nozzle body and connected to a high voltage source for electrostatically charging lubricant directed into said lubricant receiving chamber;
a capillary tube supported by said nozzle body;
said capillary tube having an inlet end communicating with said lubricant receiving chamber and an outlet end that defines a discharge orifice of said electrostatic spray head;

said capillary tube having an internal diameter between 0.020 and 0.032 inches for directing electrostatically charged lubricant from said spray head in the form of a single stream of electrostatically charged droplets in aligned relation for application onto an item to be lubricated in a controlled line having a width no greater than 0.125 inches;

said electrode being supported within said nozzle body for adjustable positioning relative to said nozzle body;

said capillary tube being supported within an upstanding support post of said nozzle body, said support post defining an entry passage communicating between said lubricant receiving chamber and said capillary tube; and said electrode having terminal end including a conical downstream end selectively positionable relative to an upstream end of said support post for controlling the lubricant flow rate through said entry passage to said capillary tube in relation to the adjusted position of the electrode.

2. The lubricant dispensing system of claim 1 in which said lubricant supply includes a heated reservoir for heating the lubricant, a lubricant supply line communicating between said heated reservoir and said nozzle body for directing heated lubricant to said lubricant receiving chamber, and a lubricant return line for recirculating lubricant from said lubricant receiving chamber to said heated reservoir.

3. The lubricant dispensing system of claim 1 in which said capillary tube is supported within the support post of the nozzle body, said support post having a conically shaped entry section communicating with said inlet end of said capillary tube, and said electrode having the conical downstream end positioned in adjacent relation to the conically shaped entry section of said support post for precisely controlling the flow of lubricant to said capillary tube.

4. The lubricant dispensing system of claim 3 in which said terminal end of said electrode is pointed and positionable within the entry section of said support post.

5. The lubricant dispensing system of claim 1 in which said electrode is threadably supported within said nozzle body and is adjustably positionable in response to rotation of the electrode.

6. The lubricant dispensing system of claim 1 in which said capillary tube is mounted within said support post with an upstream end in recessed relation to the upstream end of said support post.

7. The lubricant dispensing system of claim 6 in which the upstream end of said support post defines a frustoconical lubricant inlet tapered complimentary to the conical downstream end of the electrode.

8. The lubricant dispensing system of claim 1 the conical downstream end of said electrode has a pointed end for enhancing electron transfer of lubricant entry to said entry passage.

9. A lubricant dispensing system comprising:
a lubricant supply;
an electrostatic spray head for receiving lubricant from said lubricant supply;
said spray head including a nozzle body that defines a lubricant receiving chamber;
an electrode assembly including an electrode mounted in said nozzle body and connected to a high voltage source for electrostatically charging lubricant directed into said lubricant receiving chamber;
a capillary tube supported by said nozzle body;
said capillary tube having an inlet end communicating with said lubricant receiving chamber and an outlet end that defines a discharge orifice of said electrostatic spray head;
said capillary tube being sized for directing electrostatically charged lubricant from said spray head in the form of electrostatically charged droplets for application onto an item to be lubricated in a controlled line;
said electrode being mounted in said nozzle body for adjustable positioning relative to said nozzle body;
said electrode having a terminal end that is positionable in predetermined spaced relation to the inlet end of said capillary tube for controlling the flow rate of lubricant through said capillary tube as an incident to the adjusted position of the electrode;
said capillary tube being supported within an upstanding support post of said nozzle body, said support post defining an entry passage communicating between said lubricant receiving chamber and said capillary tube; and
said electrode terminal end including a conical downstream end selectively positionable relative to an upstream end of said support post for controlling the lubricant flow rate through said entry passage to said capillary tube in relation to the adjusted position of the electrode.

10. The lubricant dispensing system of claim 9 in which the upstream end of said support post defines a frustoconical lubricant inlet tapered complimentary to the conical downstream end of the electrode.

11. The lubricant dispensing system of claim 10 in which the conical downstream end of said electrode has a pointed end for enhancing electron transfer of lubricant directed into said entry passage.

12. The lubricant dispensing system of claim 9 in which said capillary tube has an internal diameter between 0.020 and 0.032 inches for directing electrostatically charged lubricant from said spray head in the form of a single stream of electrostatically charged droplets in aligned relation for application onto the item to be lubricated in the controlled line having a width no greater than 0.125 inches.

13. A can processing system comprising:
a processing operation for conveying and rotating cans as they are processed;
a lubricant dispenser for directing a line of lubricant adjacent an end of the cans as they are processed;
said lubricant dispenser including a lubricant supply;
said lubricant dispenser including a nozzle body that defines a lubricant receiving chamber;
an electrode assembly including an electrode mounted in said nozzle body and connected to a high voltage source for electrostatically charging lubricant directed into said lubricant receiving chamber;
a capillary tube supported by said nozzle body;
said capillary tube having an inlet end communicating with said lubricant receiving chamber and an outlet end that defines a discharge orifice of said electrostatic lubricant dispenser; and
said capillary tube being sized for directing electrostatically charged droplets from said lubricant dispenser that form a controlled line about the cans of a width no greater than 0.125 inches;
said capillary tube being supported within an upstanding support post of said nozzle body, said support post defining an entry passage communicating between said lubricant receiving chamber and said capillary tube; and said electrode having a terminal end including a conical downstream end selectively positionable relative to an upstream end of said support post for controlling the lubricant flow rate through said entry passage to said capillary tube in relation to the adjusted position of the electrode.

14. The can processing system of claim 13 in which said capillary tube has an internal diameter of between about 0.020 and 0.032 inches.

15. The can processing system of claim 14 in which the upstream end of said support post defines a frustoconical lubricant inlet tapered complimentary to the conical downstream end of the electrode.

16. The can processing system of claim 15 in which the conical downstream end of said electrode has a pointed end for enhancing electron transfer of lubricant directed into said entry passage.

* * * * *